United States Patent
Kato et al.

(10) Patent No.: US 8,199,613 B2
(45) Date of Patent: Jun. 12, 2012

(54) OBJECTIVE LENS ACTUATOR AND A THIN-SIZED OPTICAL PICKUP WITH MAGNETIC CIRCUIT HAVING DIFFERENT LENGTHED MAGNETS

(75) Inventors: Seiichi Kato, Tsuchiura (JP); Katsuhiko Kimura, Kasumigaura (JP); Takahiro Yamaguchi, Yokohama (JP); Yoshiro Konishi, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 213 days.

(21) Appl. No.: 12/542,070

(22) Filed: Aug. 17, 2009

(65) Prior Publication Data

US 2010/0067333 A1    Mar. 18, 2010

(30) Foreign Application Priority Data

Sep. 16, 2008    (JP) ................................. 2008-235854

(51) Int. Cl.
*G11B 7/09* (2006.01)
(52) U.S. Cl. .................................................... 369/44.14
(58) Field of Classification Search ............... 369/215.1, 369/219.1, 220, 244.1
See application file for complete search history.

(56) References Cited

U.S. PATENT DOCUMENTS

| | | | | |
|---|---|---|---|---|
| 4,998,802 A | * | 3/1991 | Kasuga et al. ................. | 359/814 |
| 5,488,603 A | * | 1/1996 | Tomita et al. ................. | 720/683 |
| 6,791,772 B2 | * | 9/2004 | Wakabayashi et al. ....... | 359/824 |
| 2003/0117934 A1 | * | 6/2003 | Mori et al. .................... | 369/244 |
| 2004/0022168 A1 | * | 2/2004 | Kawano et al. ............... | 369/244 |
| 2008/0117728 A1 | * | 5/2008 | Kim et al. .................. | 369/44.15 |

FOREIGN PATENT DOCUMENTS

| | | | |
|---|---|---|---|
| CN | 1447318 | | 10/2003 |
| CN | 1617237 | | 5/2005 |
| JP | 11213408 A | * | 8/1999 |
| JP | 11-316962 | | 11/1999 |

* cited by examiner

*Primary Examiner* — Peter Vincent Agustin
*Assistant Examiner* — Mark Fischer
(74) *Attorney, Agent, or Firm* — Antonelli, Terry, Stout & Kraus, LLP.

(57) ABSTRACT

An objective lens actuator, being suitable for a thin-sized optical pickup and a thin-sized optical disc apparatus, comprises: an objective lens for focusing a light upon a recording surface of an optical disc; and a driving mechanism including a focusing coil, tracking coils, and a magnetic circuit, for operating the objective lens into a focusing direction of approaching/receding to/from the optical disc, and into a tracking direction of a radius of the optical disc, wherein the magnetic circuit has a first magnet and a second magnet putting the objective lens therebetween, and one of the magnets is short of length in the focusing direction and is long in length in the tracking direction, comparing to the other magnet, thereby bringing an unnecessary moment, which is applied upon a moving part including the objective lens therein, to be small, and suppressing inclination or tilt and vibration of the objective lens.

12 Claims, 5 Drawing Sheets

MAGNET WIDTH Wa > MAGNET WIDTH Wb

MAGNET HEIGHT Ha < MAGNET HEIGHT Hb

MAGNET WIDTH Wa = MAGNET WIDTH Wb

MAGNET HEIGHT Ha < MAGNET HEIGHT Hb

OBJECTIVE LENS ACTUATOR AND A THIN-SIZED OPTICAL PICKUP WITH MAGNETIC CIRCUIT HAVING DIFFERENT LENGTHED MAGNETS

BACKGROUND OF THE INVENTION

The present invention relates to an objective lens actuator for driving an objective lens for focusing recording/reproducing light onto a recording surface of an optical disc within an optical disc apparatus, and further it relates to, in particular, an optical pickup and an optical disc apparatus comprising the same objective lens actuator therein.

An optical disc apparatus, for recording information on a disc-like recording medium or reading the information recorded thereon, is able to record a relatively large amount or volume of information on a disc, and the medium is large in the rigidity thereof, so as to be handled easily; therefore, it is used widely, such as, an external recording device for a computer or a recording apparatus for video/audio, for example.

In such optical disc apparatus, the objective lens actuator is an apparatus for driving the objective lens for focusing lights upon the recording surface on the optical disc into a focusing direction (i.e., the direction of approaching/receding to/from the optical disc surface) and a tracking direction (i.e., the radius direction of the disc). In the following Patent Document 1, there is disclosed the objective lens actuator within the conventional optical disc apparatus.

As it is shown in FIG. 1 and so on of the Patent Document 1, in general, the objective lens actuator is constructed with a moving part, including the objective lens therein, a supporting member for supporting this moving part thereon, and a magnetic circuit made up with a yoke and permanent magnets. On the moving part are attached a focusing coil and a tracking coil, and with supplying drive current through the focusing coil, the moving part is driven into the focusing direction with electro-magnetic forces, which are generated due to actions between the magnetic flux from the permanent magnets, and also in a similar manner, with supplying drive current through the tracking coil, the moving part is driven into the tracking direction with electro-magnetic forces, which are generated due to actions between the magnetic flux from the permanent magnets.

[Patent Document 1] Japanese Patent Laying-Open No. Hei 11-316962 (1999), (see, page 5 and FIG. 1).

BRIEF SUMMARY OF THE INVENTION

In the conventional art as mentioned above, the magnetic circuit has two (2) sets of magnets, with putting the objective lens therebetween, wherein because those two (2) sets of magnets are equal to each other in the length in the focusing direction, therefore a difference is generated between the two (2) driving forces in the focusing direction, which are generated on the focusing coil due to the two (2) sets of magnets, and a moment is produced on the moving part including the objective lens therein. The moment mentioned above inclines the objective lens, and this comes to a cause of deteriorating focusing condition of a light spot. Such deterioration of quality of the light spot results into signal deterioration when recording/reproducing.

In particular, advancement is made on high density recording on the optical disc, in recent years, and then a laser wavelength of the recording/reproducing light comes to be short while an aperture of the objective lens comes to be large. For this reason, unnecessary inclination or tilt of the objective lens, which is generated on the objective lens with respect to the optical disc, affects ill influences upon the focusing condition of the optical spot even if it is very small. Accordingly, the shortcomings in conventional art brought a necessity of suppressing the unnecessary change of position and/or the inclination of the objective lens with respect to the optical disc.

Also, the moment mentioned above is a cause of reason of vibration of the moving part including the objective lens, too, in a high frequency band, on the vibration characteristics of the objective lens actuator, and disturbance of phase and/or position change due to the vibration mentioned above result into a factor of instability of the control. In particular, advancement is made on high speed recording/reproducing onto/from the optical disc, in recent years, and since it is desired to increase the frequency of control band, then the vibration mentioned above comes to an obstacle of achieving the high speed recording/reproducing, and disables dealing with the high speed recording/reproducing.

An object of the present invention, by taking such the situation into the consideration thereof, is to provide an objective lens actuator for enabling to suppress unnecessary inclination and vibration of the objective lens to the optical disc.

For accomplishing the object mentioned above, according to the present invention, there is provided an objective lens actuator, comprising: an objective lens for focusing a light upon a recording surface of an optical disc; and a driving means including a focusing coil, tracking coils, and a magnetic circuit, for operating said objective lens into a focusing direction of approaching/receding to/from said optical disc, and into a tracking direction of a radius of the optical disc, wherein said magnetic circuit has two (2) magnets with said objective lens therebetween, and one of the magnets is shorter in length in the focusing direction than an other magnet and is longer in length in the tracking direction, comparing to the other magnet.

Also, the object mentioned above is accomplished by the objective lens actuator, as described above, wherein said magnetic circuit has two (2) magnets putting said objective lens therebetween, and one of the magnets is shorter in length in the focusing direction than an other magnet and is longer in length in the tracking direction, comparing to the other magnet, so that those two (2) magnets are same in values thereof.

Also, the object mentioned above is accomplished by the objective lens actuator, as described above, further comprising an optical part on a side of said optical disc putting said objective lens therebetween, wherein a light in a direction in parallel with an optical disc surface, being incident upon said optical part and passing through said objective, is focused on the recording surface of said optical disc, and said magnetic circuit has two (2) magnets putting said objective lens therebetween, and one of the magnets is shorter in length in the focusing direction and is longer in length in the tracking direction, comparing to the other magnet.

Further, the object mentioned above is accomplished by the objective lens actuator, as described above, wherein a line connecting between centers of two (2) driving forces in the focusing direction, which are generated on said focusing coils by said two (2) magnets, is in conformity with a center of gravity of a moving part, including said objective lens therein.

And further, the object mentioned above is accomplished by an optical pickup, or an optical disc apparatus for reproducing information from an optical disc and for recording information onto the optical disc, comprising the objective lens actuator as described above.

Thus, according to the present invention, because of the structures of applying no unnecessary moment upon the moving part, including the objective lens therein, an unnecessary inclination or tilt of the objective lens to the optical disc can be suppressed to be small. For this reason, since the quality of a beam spot can be improved, therefore it is possible to conduct recording/reproducing upon an optical disc, which will be heighten in the recording density thereof, with stability.

Also, because of structures of applying no unnecessary moment upon the moving part, including the objective lens therein, it is possible to provide an objective lens actuator without unnecessary vibration in the moving part, and with applying this objective lens actuator, it is possible to provide an optical pickup, as well as, an optical disc apparatus, having preferable information recording/reproducing characteristics and enabling high-speed recording/reproducing.

Also, since the length of one of the magnets can be shorten in the focusing direction, it is possible to conduct recording/reproducing, preferably, due to the reason mentioned above, even by using a lower surface of the same magnet, on the opposite side to the disc side in the focusing direction. For this reason, it is possible to provide an objective lens actuator suitable for thin-sizing of the optical pickup and the optical disc apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

FIGS. 1 to 6 are drawings for showing the embodiment of the present invention, wherein it is assumed that an element attached with the same depicts the same, and that the fundamental structures and operations thereof are equal to each other. Also, in FIGS. 1 to 6, "x"-axis direction is the direction of tangential line of an optical disc not shown in the figure, i.e., the tangential direction, "y"-axis is the direction of radius of the optical disc, i.e., the tracking direction, and "z"-axis is the direction of optical axis of an objective lens, i.e., the focus direction, respectively.

Embodiment 1

Explanation will be made on a first embodiment of the objective lens actuator, according to the present invention.

Figure 1:
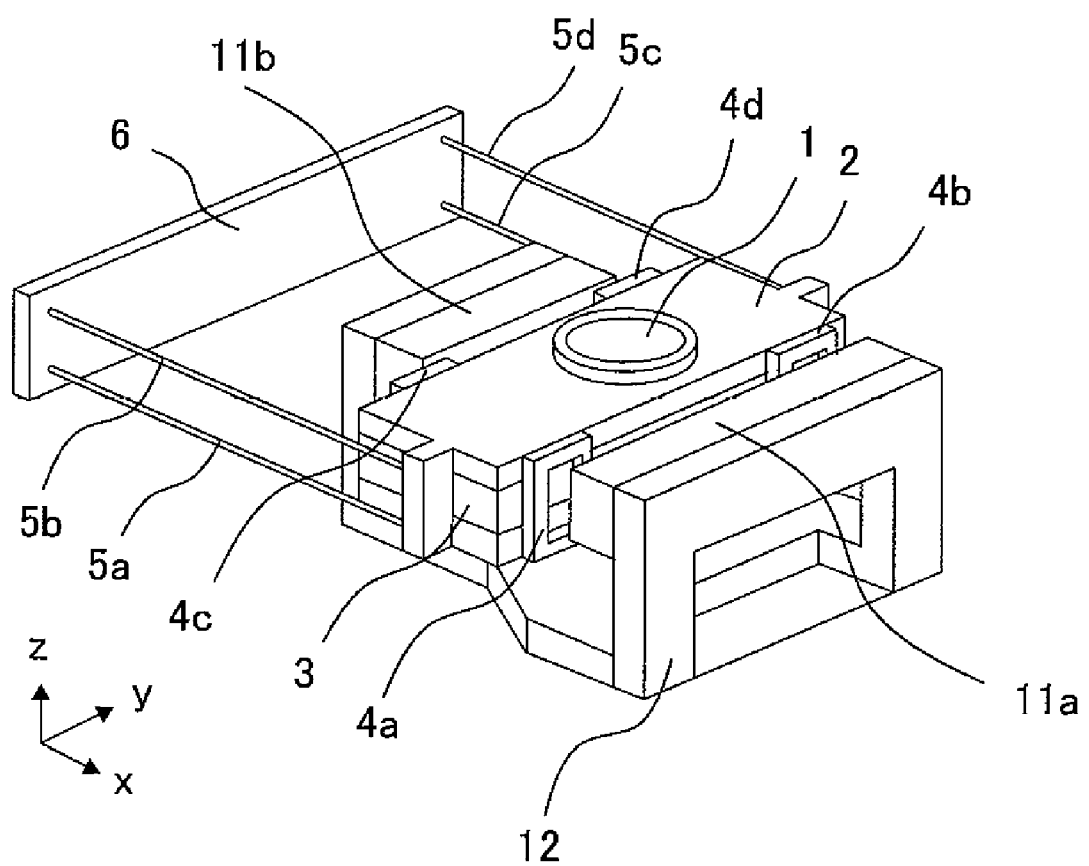
FIG. 1 is a perspective view for showing an embodiment of an objective lens actuator, according to the present invention.

FIG. 1 is a perspective view for showing the outline structures of the objective lens actuator, according to the present embodiment. In FIG. 1, the objective lens actuator comprises an objective lens 1, a lens holder 2 for holding it thereon, a support means of the lens holder 2, and magnets disposed on the periphery the lens holder 2. On a side surface of the lens holder 2 are attached a focusing coil 3, tracking coils 4a, 4b, 4c and 4d at the predetermined positions thereof.

The holder means of the lens holder 2 is supported by elastic supporting members 5a, 5b, 5c and 5d, each end of which is fixed on a fixed portion 6. Those elastic supporting members have conductivity, so that they play the poles of supplying current to the tracking coils 4a to 4d, in common.

The focusing coil 3 and the tracking coils 4a to 4d are electrically connected with end portions of the elastic supporting members 5a to 5d, on the side at which they hold the lens holder, through a conductive welding material, such as, a solder, etc. On the fixed portion 6 is fixed a dumping holder, which is filled up with an elastic member, such as, a silicon gel, etc., i.e., building up the structure for supplying attenuations to the elastic supporting members 5a to 5d.

Herein, the objective lens 1, the lens holder 2, the focusing coil 3 and the tracking coils 4a to 4d are movable portions.

On the periphery of the lens holder are disposed permanent magnets 11a and 11b and a yoke 12, as a magnet for applying driving forces onto a group of coils. The permanent magnets 11a and 11b are so disposed that, in the magnetizing directions thereof, the magnetic surfaces opposing to each other in the "x"-axis direction are in the same phase. Each of the magnets 11a and 11b is fixed by attaching it on the yoke 12 made from a yoke member of magnetic material forms a magnetic circuit, and forms a magnetic circuit. With this magnetic circuit, the objective lens actuator can move into the focusing direction and the tracking direction.

Figure 2A:
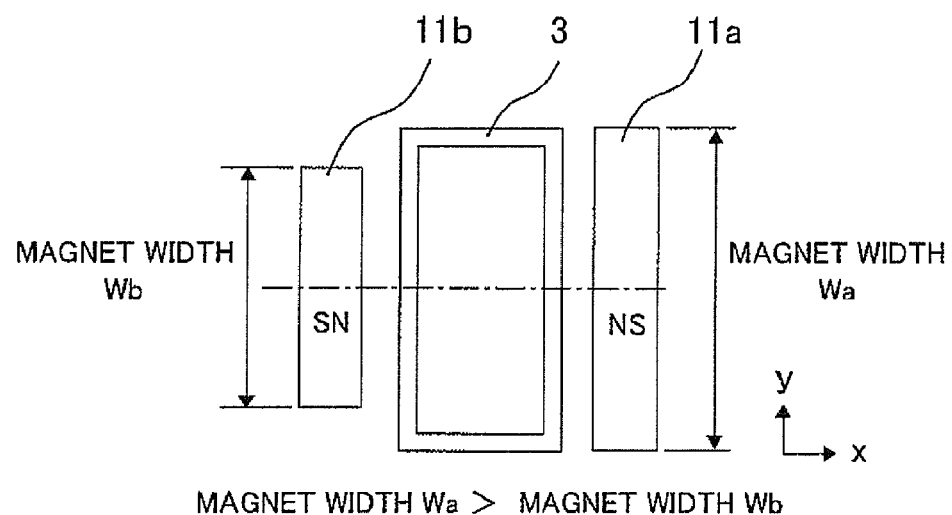
FIGS. 2A and 2B are cross-section views of a magnetic circuit, according to the present invention, viewed in the focusing direction and the tracking direction, respectively.
Figure 2B:
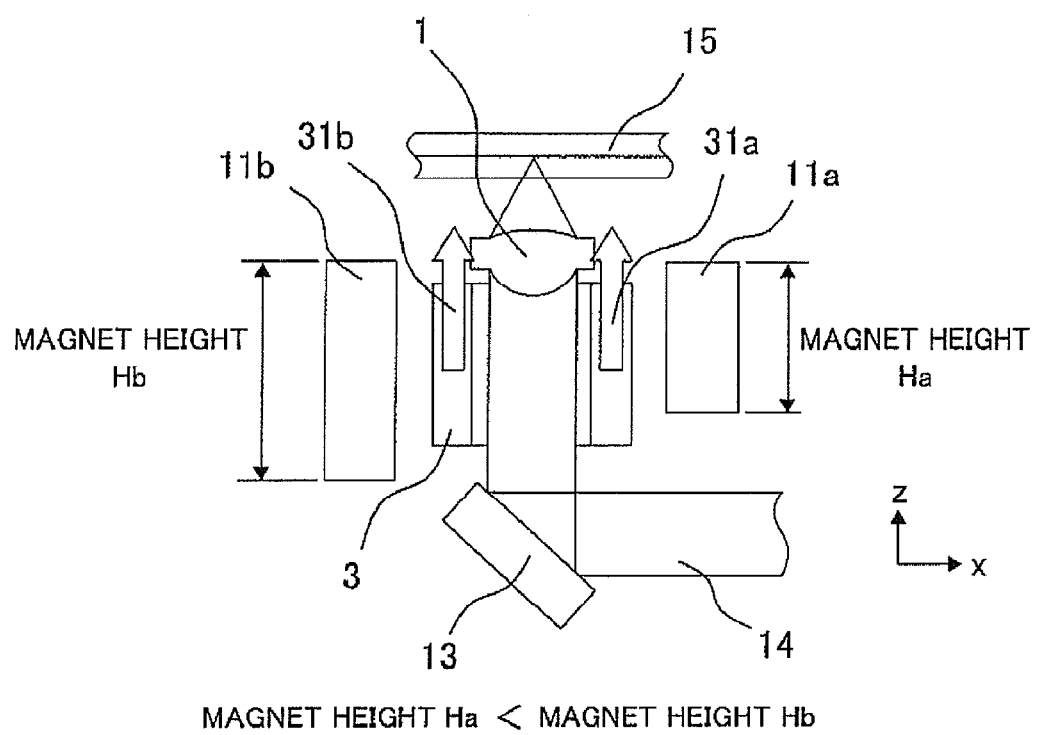

FIGS. 2A and 2B show the structures and the arrangement of the magnets 11a and 11b, according to the present invention. For dealing with thin-sizing, according to the present invention, on the reverse side to the optical disc, putting the objective lens therebetween, there is provided an optical part 13, such as, a reflection mirror or a prism or the like, for example, and alight 14 propagating from the direction in parallel with the optical disc surface (i.e., the "x"-axis direction in FIG. 2) is incident upon the optical part 13 mentioned above, and upon the optical parts 13 it is reflected to direct to the recording surface of an optical disc 15, vertically, and it passes through the objective lens 1 so that the light is focused on the recording surface of the optical disc 15.

The magnet 11a in the direction, into which the light 14 is incident upon the optical part 13, has such structures that it is shorter in the length in the focusing direction (i.e., height "H" of the magnet) and is longer in the length in the tracking direction (i.e., width "W" of the magnet), comparing to the other magnet 11b. Since the magnet 11a in the direction, into which the light 14 is incident upon the optical part 13, can be shorten of the length in the focusing direction, then the light 14 can passes through the reverse side against to the optical disc, in the focusing direction of the magnet 11a, i.e., having the structures for enabling thin-sizing of the objective lens actuator.

Explanation will be made on effects obtainable according to the present invention, by referring to FIGS. 2A and 2B and 3A and 3B.

Figure 3A:
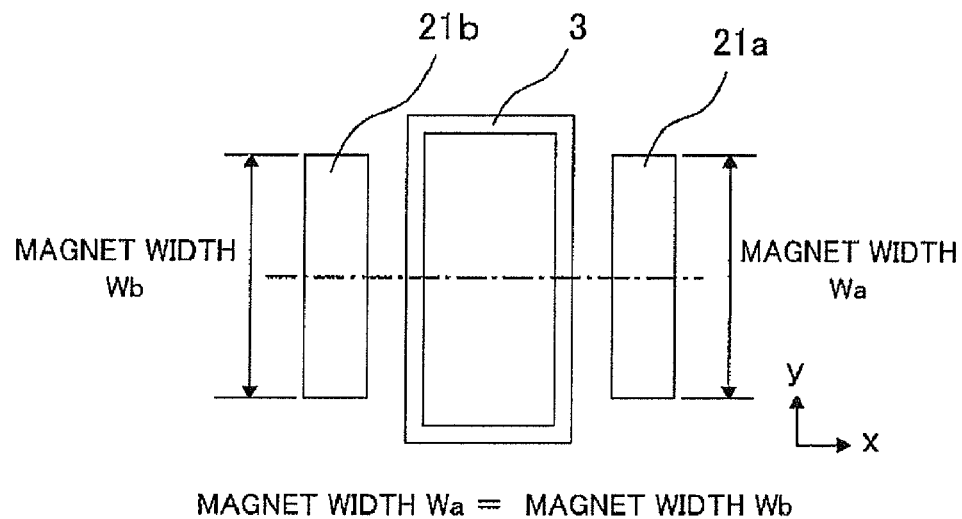
FIGS. 3A and 3B are cross-section views of a magnetic circuit, according to the prior art, viewed in the focusing direction and the tracking direction, respectively.
Figure 3B:
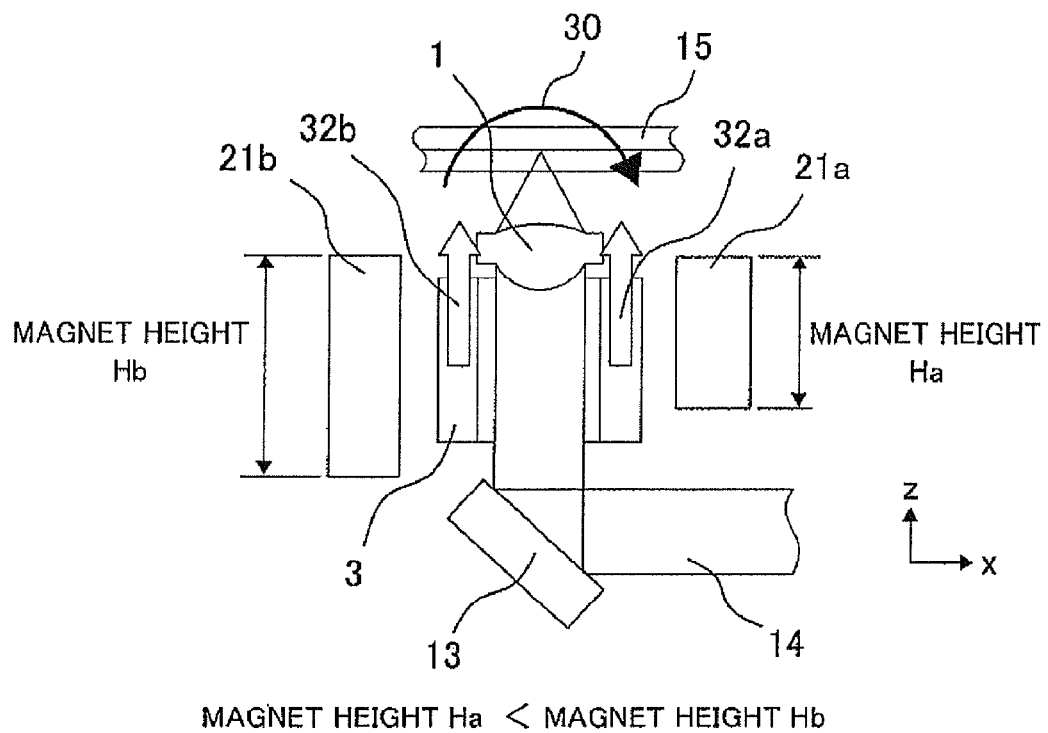

FIGS. 3A and 3B show the structures of shortening the length of a magnet 21a on the side, upon which the light 14 is incident, for dealing with the thin-sizing.

In the structures shown in FIGS. 3A and 3B, when current is supplied into the focusing coil 3, the driving force 32a in the focusing direction, which is applied by the magnet 21a provided on the side, upon which the light 14 is incident, since it is smaller in the size thereof comparing to that of the other magnet 21b, comes to be smaller than the focusing driving force 32b, which is applied upon the focusing coil 3 by the other magnet 21b. Because of this difference between two (2) driving forces 32a and 32b in the focusing direction, which is produced on the focusing coil 3, a moment 30 is generated on the moving part, including the objective lens 1 therein. The mentioned moment 30 inclines the objective lens 1, and comes into a reason of deterioration of focusing condition of a beam spot.

Such deterioration of quality of the beam spot also results into deterioration of signals when recording/reproducing. Also, the moment 30 mentioned above is a factor of vibration of the moving part, including the objective lens therein, in high-frequency band, on the vibration characteristics of the objective lens actuator, and disturbances of the phase and/or change of position result into factors of instability. For this reason, it is impossible to heighten the control band, and it is difficult to deal with the high-speed recording/reproducing.

On the contrary to that, according to the present invention, when current is applied into the focusing coil 3, as is shown in FIG. 2, the driving force 31a in the focusing direction, which is applied on the focusing coil 3 on the incident side magnet 11a, since it is equal to in the size thereof, comparing to the other magnet 11b, comes to be equal to the driving force 31b in the focusing direction, which is applied upon the focusing coil 3 by the other magnet 11b. The moment 30 is zero (0), and then no moment is generated.

Accordingly, with provision of the objective lens actuator according to the present invention, because of the structures of applying no unnecessary moment upon the moving part, including the objective lens 1 therein, since the unnecessary inclination or tilt of the objective lens 1 can be suppressed to be small with respect to the optical disc, and the quality of the beam spot can be improved, then it is possible to conduct the recording/reproducing onto/from the optical disc, on which further high-density recording is demanded much more, with stability. Also, because of the structures of applying no unnecessary moment upon the moving part, including the objective lens 1 therein, it is possible to provide an objective lens actuator without unnecessary vibration of the moving part, an optical pickup and further an optical disc apparatus, being preferable in the characteristics of recording or reproducing of information and enabling the high-speed recording/reproducing. Also, since it is possible to shorten the length of the magnet 11a provided on the side, upon which the light 14 is incident, in the length thereof, even if using a lower surface of the same magnet on the reverse side, i.e., opposing to the side of the optical disc, in the focusing direction, preferable recording/reproducing can be made with the reasons mentioned above, and therefore it is possible to provide the objective lens actuator, being suitable for achieving thin-sizing of the optical pickup and the optical disc apparatus.

In that instance, the length of the magnet 11a provided on the side, upon which the light 14 is incident, may be shorten in the focusing direction, and lengthen in the tracking direction, so that those two (2) sets of magnets come to be equal to in the size (or volume) thereof.

Embodiment 2

Figure 4:
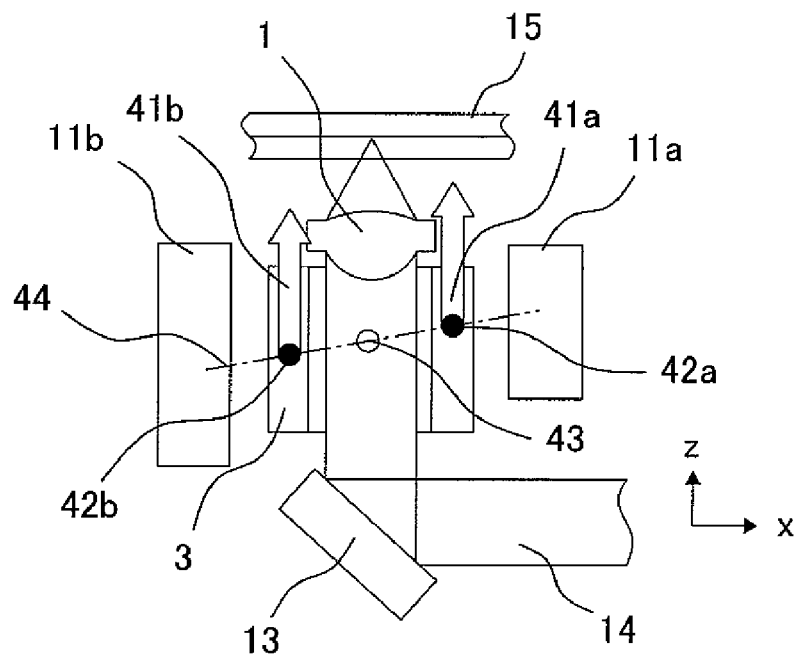
FIG. 4 is a view for showing other embodiment of the present invention.

Next, other embodiment according to the present invention will be shown in FIG. 4.

As is shown in FIG. 4, when difference is produced between the positions where those two (2) sets of magnets, in the focusing direction, a driving force 41a in the focusing direction, which is applied upon the focusing coil 3 by the magnet 11a on the incident side, acts at a driving center 42a, while a driving force 41b in the focusing direction, which is applied upon the focusing coil 3 by the other magnet 11b, acts at a driving center 42b, then a distance is generated between the positions of the two (2) driving centers 42a and 42b in the focusing direction.

With a magnetic circuit, disposing the focusing coil 3 or the magnets 11a and 11b are so arranged that a center of gravity 43 of the moving part, including the objective lens 1 therein, on a line 44 connecting between the driving center 42a and the driving center 42b, since the distance can be made small, from the center of gravity up to the driving center where the driving force is applied onto the moving part, even if variety or fluctuation is generated in attaching of parts when assembling, then the unnecessary moment comes to be small; therefore, it is possible suppress the vibration.

Also, disposing a support center, which can be obtained by the elastic supporting members 5a to 5d, on the line 44 connecting between the driving center 42a and the driving center 42b, in the place of the center of gravity mentioned above, since the distance can be made small, from the support center up to the driving center where the driving force is applied onto the moving part, even if variety or fluctuation is generated in attaching of parts when assembling, then the unnecessary moment comes to be small; therefore, it is possible suppress the vibration.

Embodiment 3

Next, explanation will be given on an embodiment of mounting the objective lens actuator 101 onto an optical pickup 111, according to the present invention, by referring to FIG. 5. Herein is shown an embodiment of applying therein the objective lens actuator 101 shown in the first embodiment mentioned above, however the optical pickup 111 can be also built up with, in the similar manner, even if applying therein the objective lens actuator shown in the other embodiment.

Figure 5:
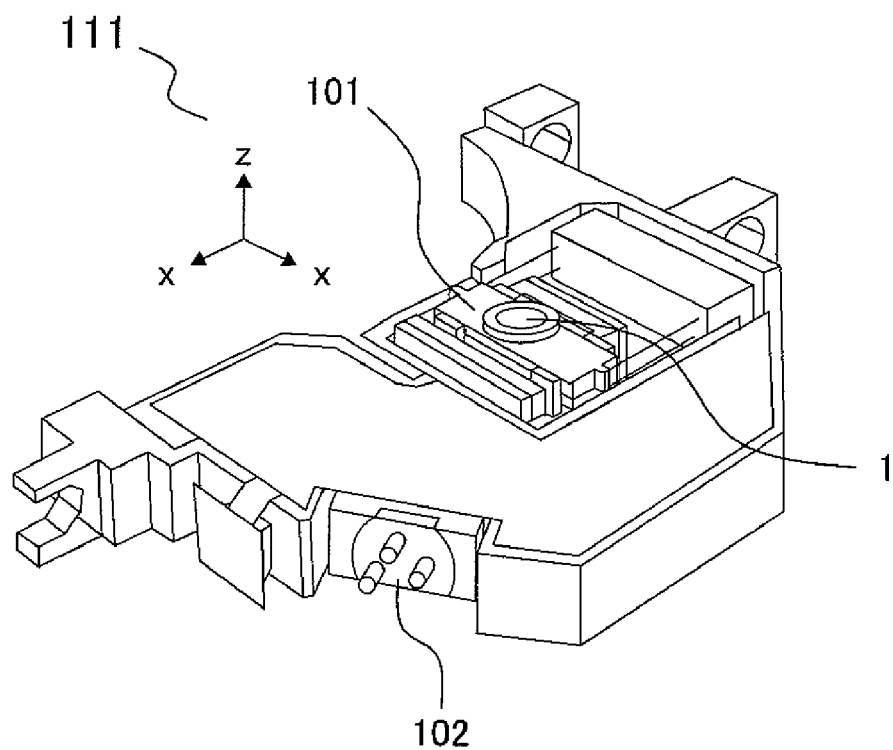
FIG. 5 is a perspective view for showing an optical pickup, applying the objective lens actuator according to the present invention therein.

As is shown in FIG. 5, the objective lens actuator 101 is installed within the optical pickup 111. A light emitting from a light emitting element 102 is focused upon the recording surface of an optical disc by means of the objective lens 1. In this manner, with applying the objective lens actuator according to the present invention, there can be obtained the optical pickup 111 suitable for high-density of data and high-speed recording/reproducing thereof, and also for small or thin-sizing of the apparatus.

Embodiment 4

Figure 6:
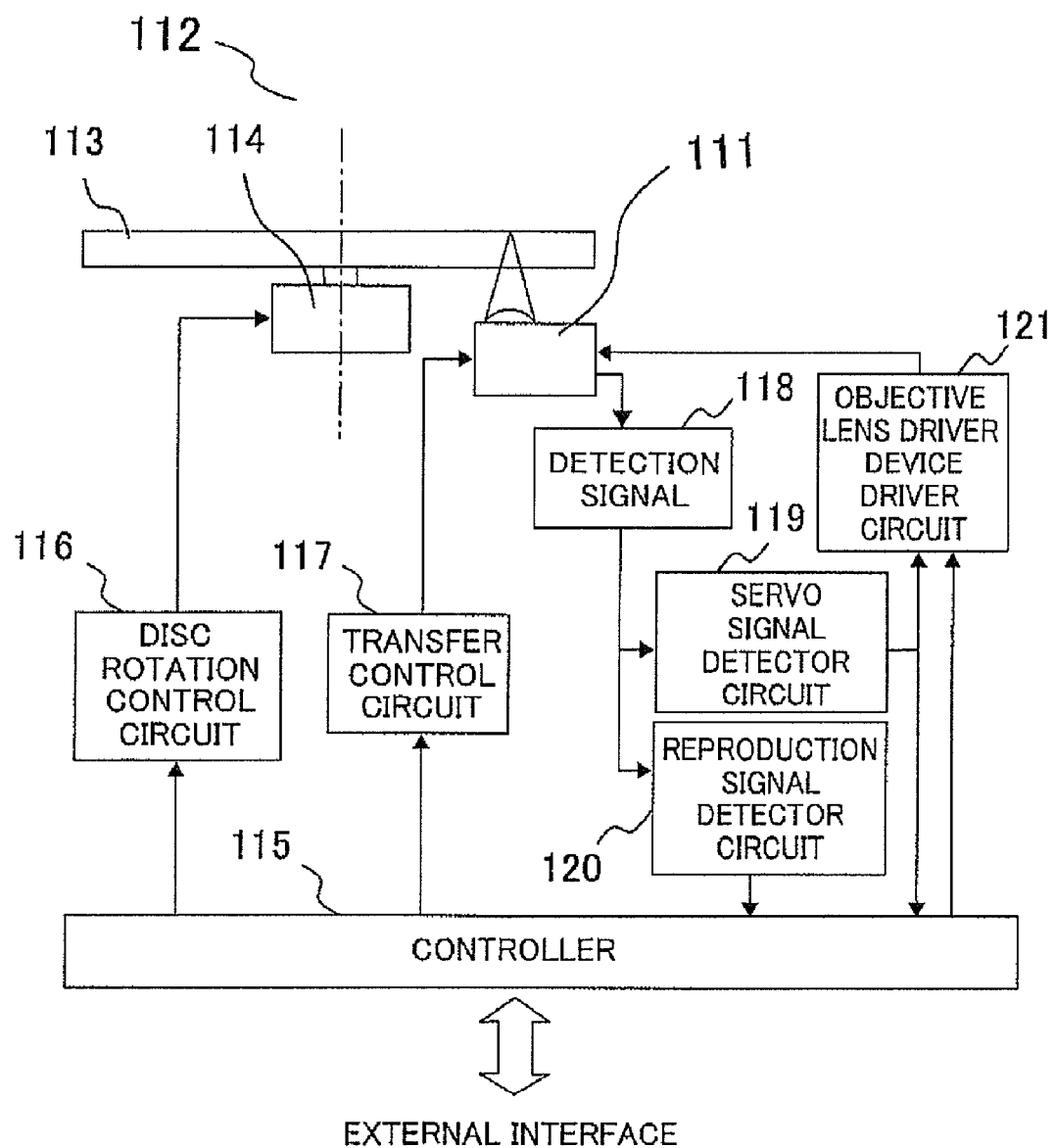
FIG. 6 is a block diagram for showing an optical disc apparatus, applying the objective lens actuator according to the present invention therein.

Next, explanation will be made on an embodiment of an optical disc apparatus applying the optical pickup 111, which mounts the objective lens actuator thereon, according to the present invention, by referring to FIG. 6. Herein is shown an embodiment of applying the optical pickup 111, which is shown in the first embodiment mentioned above, however the optical disc apparatus 112 can be built up with, in the similar manner, in case of applying therein the optical pickup in the other embodiments.

The optical disc apparatus 112 comprises a spindle motor 114 for rotating the optical disc 113, the optical pickup 111 a transfer mechanism for moving the optical pickup 111 into the radius direction of the optical disc 113, and a controller 115 for controlling those. With the controller 115 is connected a rotation control circuit 116 of the spindle motor 114, so that the rotation control is conducted on the optical disc 113, which is attached on the spindle motor 114. Also, with the controller 15 is connected a transfer control circuit 117 of the optical pickup 1, so that the transfer control is conducted for transferring the optical pickup 111 into the radius direction of the optical disc 113.

Various kinds of signals 118, which are detected by the optical pickup 111, are sent to a servo signal detector circuit 119 and a reproduction signal detector circuit 120, and a focus error signal and a tracking error signal are produced by the servo signal detector circuit 119, wherein position control of the objective lens is conducted upon basis of a signal from an actuator driver circuit 121, in addition to an instruction from the controller 115. Also, by means of the reproduction signal detector circuit, the information recorded on the optical disc 113 is reproduced.

In this manner, with mounting the optical pickup 111 according to the present invention thereon, it is possible to achieve the high-performance optical disc apparatus 112, being suitable for the high-speed recording/reproducing and high-density recording/reproducing of data.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An objective lens actuator, comprising:
    an objective lens for focusing a light upon a recording surface of an optical disc; and
    a driving mechanism including a focusing coil, tracking coils, and a magnetic circuit, for operating said objective lens into a focusing direction of approaching/receding to/from said optical disc, and into a tracking direction of a radius of the optical disc, wherein
    said magnetic circuit has a first magnet and a second magnet with said objective lens therebetween, where the first magnet has a shorter overall length in the focusing direction than the second magnet and has a longer overall length in the tracking direction than the second magnet.

2. The objective lens actuator, as is described in the claim 1, wherein a line connecting between centers of two (2) driving forces in the focusing direction, which are generated on said focusing coils by the first and the second magnet is in conformity with a center of gravity of a moving part, including said objective lens therein.

3. An optical pickup, being mounted on an optical disc apparatus for reproducing information from an optical disc and for recording information onto the optical disc, comprising the objective lens actuator as described in the claim 1.

4. The optical disc apparatus for reproducing information from an optical disc and for recording information onto the optical disc, comprising the optical pickup as described in the claim 3.

5. An objective lens actuator, comprising:
    an objective lens for focusing a light upon a recording surface of an optical disc; and
    a driving mechanism including a focusing coil, tracking coils, and a magnetic circuit, for operating said objective lens into a focusing direction of approaching/receding to/from said optical disc, and into a tracking direction of a radius of the optical disc, wherein
    said magnetic circuit has a first magnet and a second magnet with said objective lens therebetween, where the first magnet has a shorter overall length in the focusing direction than the second magnet and has a longer overall length in the tracking direction than the second magnet, so that those two (2) magnets generate equal driving forces.

6. The objective lens actuator, as is described in the claim 5, wherein a line connecting between centers of two (2) driving forces in the focusing direction, which are generated on said focusing coils by the first and second magnet, is in conformity with a center of gravity of a moving part, including said objective lens therein.

7. An optical pickup, being mounted on an optical disc apparatus for reproducing information from an optical disc and for recording information onto the optical disc, comprising the objective lens actuator as described in the claim 5.

8. The optical disc apparatus for reproducing information from an optical disc and for recording information onto the optical disc, comprising the optical pickup as described in the claim 7.

9. An objective lens actuator, comprising:
    an objective lens for focusing a light upon a recording surface of an optical disc;
    a driving mechanism including a focusing coil, tracking coils, and a magnetic circuit, for operating said objective lens into a focusing direction of approaching/receding to/from said optical disc, and into a tracking direction of a radius of the optical disc; and
    an optical part on a reverse-side of said optical disc with said objective lens being located between said optical part and said optical disc, wherein a light in a direction in parallel with an optical disc surface, being incident upon said optical part and passing through said objective lens, is focused on the recording surface of said optical disc, and
    said magnetic circuit has a first magnet and a second magnet, with said objective lens therebetween, where the first magnet has a shorter overall length in the focusing direction than the second magnet and has a longer overall length in the tracking direction than the second magnet.

10. The objective lens actuator, as is described in the claim 9, wherein a line connecting between centers of two (2) driving forces in the focusing direction, which are generated on said focusing coils by the first and second magnet, is in conformity with a center of gravity of a moving part, including said objective lens therein.

11. An optical pickup, being mounted on an optical disc apparatus for reproducing information from an optical disc and for recording information onto the optical disc, comprising the objective lens actuator as described in the claim 9.

12. The optical disc apparatus for reproducing information from an optical disc and for recording information onto the optical disc, comprising the optical pickup as described in the claim 11.

* * * * *